(12) United States Patent
Kim et al.

(10) Patent No.: US 10,396,325 B2
(45) Date of Patent: Aug. 27, 2019

(54) BATTERY MODULE AND BATTERY PACK COMPRISING SAME

(71) Applicant: LG CHEM, LTD., Seoul (KR)

(72) Inventors: Hwa-Joong Kim, Daejeon (KR); Tae-Young Kang, Daejeon (KR); Do-Hyeon Kim, Daejeon (KR); Duck-Hee Moon, Daejeon (KR); Jun-Yeob Seong, Daejeon (KR)

(73) Assignee: LG CHEM, LTD., Seoul (KR)

( * ) Notice: Subject to any disclaimer, the term of this patent is extended or adjusted under 35 U.S.C. 154(b) by 141 days.

(21) Appl. No.: 15/736,454

(22) PCT Filed: Jan. 19, 2017

(86) PCT No.: PCT/KR2017/000686
§ 371 (c)(1),
(2) Date: Dec. 14, 2017

(87) PCT Pub. No.: WO2017/135600
PCT Pub. Date: Aug. 10, 2017

(65) Prior Publication Data
US 2018/0175351 A1   Jun. 21, 2018

(30) Foreign Application Priority Data

Feb. 5, 2016   (KR) .......................... 10-2016-0015160

(51) Int. Cl.
*H01M 2/10*   (2006.01)
*F16B 43/00*   (2006.01)
(Continued)

(52) U.S. Cl.
CPC ........... *H01M 2/1094* (2013.01); *B60L 50/64* (2019.02); *B60L 50/66* (2019.02); *F16B 39/10* (2013.01);
(Continued)

(58) Field of Classification Search
CPC ....... H01M 2/1094; B60L 50/64; F16B 39/10; F16B 39/103; F16B 39/282; F16B 43/001; F16B 43/003
(Continued)

(56) References Cited

U.S. PATENT DOCUMENTS 5,031,924 A * 7/1991 Beatenbough ......... F16J 15/061
165/173
8,002,957 B2 * 8/2011 Grincourt .......... G01N 27/4045
204/414
(Continued)

FOREIGN PATENT DOCUMENTS

JP   2005-116433 A   4/2005
JP   2011-243449 A   12/2011
(Continued)

OTHER PUBLICATIONS

English machine translation of JP 2011-243449-A.
International Search Report for PCT/KR2017/000686 dated Apr. 27, 2017.

*Primary Examiner* — Bryan D. Ripa
*Assistant Examiner* — James M Erwin
(74) *Attorney, Agent, or Firm* — Birch, Stewart, Kolasch & Birch, LLP

(57) ABSTRACT

The present disclosure relates to a battery module, which includes: a housing including a first housing and a second housing, which are coupled to each other to form a accommodation space; a plurality of secondary batteries accommodated in the accommodation space; a bolt including a screw portion, which has screw threads formed on at least a portion of an outer circumferential surface thereof, and a bolt head arranged at an end of the screw portion, the bolt being configured to fasten the first housing and the second housing to each other by being mounted such that the screw portion penetrates the first housing to be screw-coupled to
(Continued)

the second housing, and that the bolt head is caught by the first housing; and an O-ring mounted to be interposed between the first housing and the bolt head, wherein the O-ring includes: a hollow pierced such that the screw portion is inserted therein; and a recognition protrusion formed to protrude in a radial direction of the bolt head as compared with the bolt head.

12 Claims, 4 Drawing Sheets

(51) Int. Cl.
*F16B 39/10* (2006.01)
*B60L 50/60* (2019.01)
*B60L 50/64* (2019.01)
*H01M 10/0525* (2010.01)

(52) U.S. Cl.
CPC .......... *F16B 39/103* (2013.01); *F16B 43/001* (2013.01); *F16B 43/003* (2013.01); *H01M 2/1077* (2013.01); *H01M 2/1083* (2013.01); *H01M 10/0525* (2013.01); *H01M 2220/20* (2013.01); *Y02T 10/7005* (2013.01); *Y02T 10/7055* (2013.01)

(58) Field of Classification Search
USPC .......................................................... 429/99
See application file for complete search history.

(56) References Cited

U.S. PATENT DOCUMENTS

| | | |
|---|---|---|
| 2012/0156537 A1 | 6/2012 | Meintschel et al. |
| 2013/0040180 A1 | 2/2013 | Lim |
| 2014/0050966 A1 | 2/2014 | Merriman et al. |
| 2014/0087221 A1 | 3/2014 | Kim et al. |

FOREIGN PATENT DOCUMENTS

| | | |
|---|---|---|
| KR | 10-0177214 B1 | 5/1999 |
| KR | 10-0907990 B1 | 7/2009 |
| KR | 10-1177764 B1 | 8/2012 |
| KR | 10-2013-0001381 A | 1/2013 |
| KR | 10-2013-0017289 A | 2/2013 |
| WO | WO 2011/145547 A1 | 11/2011 |

* cited by examiner

BATTERY MODULE AND BATTERY PACK COMPRISING SAME

TECHNICAL FIELD

The present disclosure relates to a battery module and a battery pack including the same.

The present application claims priority to Korean Patent Application No. 10-2016-0015160 filed on Feb. 5, 2016 in the Republic of Korea, the disclosure of which is incorporated herein by reference.

BACKGROUND ART

Recently, as the demand for portable electronic products such as notebooks, video cameras, mobile phones, and the like is rapidly increased, and the development of electric vehicles, energy storage batteries, robots, satellite, and the like is accelerated, high-performance secondary batteries capable of being repeatedly charged and discharged are being actively studied.

Currently commercialized secondary batteries include nickel cadmium batteries, nickel metal hydride batteries, nickel zinc batteries, lithium secondary batteries, and the like. Among these secondary batteries, since lithium secondary batteries have advantages of being freely charged and discharged due to almost no memory effect as compared with nickel-based batteries and having extremely low self-discharge rate and high energy density, lithium secondary batteries are spotlighted.

Such lithium secondary batteries mainly include a lithium-based oxide and a carbon material as a positive electrode active material and a negative electrode active material, respectively. Lithium secondary batteries include an electrode assembly, in which a positive electrode plate and a negative electrode plate respectively coated with a positive electrode active material and an negative electrode active material are arranged with a separator therebetween, and an exterior, that is, a battery case, in which the electrode assembly and an electrolyte are sealed and accommodated.

Generally, depending upon shapes of exteriors, lithium secondary batteries may be classified into can-type secondary batteries, in which an electrode assembly is embedded in a metal can, and pouch-type secondary batteries, in which an electrode assembly is embedded in a pouch of an aluminum laminate sheet.

Recently, secondary batteries are widely used in medium and large-sized devices such as automobiles or power storage devices as well as in small-sized devices such as portable electronic devices. When secondary batteries are used in medium and large-sized devices, a large number of secondary batteries are electrically connected to each other for improving capacity and output. In particular, pouch-type secondary batteries are frequently used in medium and large-sized devices due to a merit of being easily accommodated and stacked.

FIG. 1 is a schematic diagram illustrating a battery module according to the related art.

As such, a battery module 1 may refer to a component in which a large number of secondary batteries 22 are connected in series or parallel for improving capacity, output, and the like. Generally, the battery module 1 includes a case 10 accommodating a secondary battery stacked body 20 in which the large number of secondary batteries 22 are stacked. In addition, as shown in FIG. 1, the case 10 includes an upper case 12 accommodating an upper portion of the secondary battery stacked body 20 and a lower case 14 accommodating a lower portion of the secondary battery stacked body 20, and the upper case 12 and the lower case 14 are fastened to each other by a bolt 30. As shown in FIG. 1, the bolt 30 is mounted such that a screw portion 32 is inserted into a bolt hole 16 pierced in the upper case 12 and screw-coupled to the lower case 14, and that a bolt head 34 is caught by the upper case 12, thereby fastening the upper case 12 and the lower case to each other.

However, when internal gas is generated from the secondary batteries 22 during charge-discharge of the secondary batteries 22, there is a concern that the internal gas of the secondary batteries 22 is leaked outside the battery module 1 through the bolt hole 16 of the upper case 12. To solve this problem, in the battery module 1 according to the related art, an O-ring 40 is mounted to be interposed between the bolt head 34 and the upper case 12, thereby sealing the bolt hole 16. The O-ring 40 is mounted for the screw portion 32 of the bolt 30 to be inserted into a hollow thereof, and thus is interposed between the bolt head 34 and the upper case 12. However, since the O-ring 40 generally has a smaller diameter than the bolt head 34, the bolt 30 needs to be separated from the bolt hole 16 for inspecting whether the O-ring 40 is mounted. Therefore, in the battery module 1 according to the related art, there are problems in that a lot of time is required for inspecting whether the O-ring 40 for sealing the bolt hole 16 is mounted, and that there is a concern of occurrence of errors in inspection results due to a complicated method of inspecting whether the O-ring 40 is mounted.

In addition, since the O-ring 40 is generally manufactured from a synthetic material having elasticity, there are some cases in which the O-ring 40 is twisted to be dragged toward the center thereof due to a shear force applied between the bolt head 34 and the O-ring 40 in the process of tightening the bolt 30. As such, when the O-ring 40 is twisted, the internal gas of the secondary batteries 22 may be leaked outside the battery module 1 through the bolt hole 16, like in the case that the O-ring 40 is not mounted. To inspect the twist of the O-ring 40, the bolt 30 needs to be separated from the bolt hole 16, like in the case of inspecting whether the O-ring 40 is mounted. Therefore, in the battery module 1 according to the related art, there are problems in that a lot of time is required for inspecting whether the O-ring 40 for sealing the bolt hole 16 is twisted, and that there is a concern of occurrence of errors in inspection results due to a complicated method of inspecting whether the O-ring 40 is twisted.

DISCLOSURE

Technical Problem

The present disclosure is designed to solve the problems of the related art, and therefore the present disclosure is directed to providing a battery module, which has a structure improved to easily inspect whether an O-ring for preventing leakage of internal gas of a secondary battery is mounted and whether the O-ring is twisted, and a battery pack including the battery module.

Technical Solution

In one aspect of the present disclosure, there is provided a battery module comprising: a housing comprising a first housing and a second housing, which are coupled to each other to form a accommodation space; a plurality of secondary batteries accommodated in the accommodation space; a bolt comprising a screw portion, which has screw threads formed on at least a portion of an outer circumferential surface thereof, and a bolt head arranged at an end of the screw portion, the bolt being configured to fasten the first housing and the second housing to each other by being mounted such that the screw portion penetrates the first housing to be screw-coupled to the second housing, and that the bolt head is caught by the first housing; and an O-ring mounted to be interposed between the first housing and the bolt head, wherein the O-ring comprises: a hollow pierced such that the screw portion is inserted therein; and a recognition protrusion formed to protrude in a radial direction of the bolt head as compared with the bolt head.

Preferably, the O-ring has a diameter that is equal to or less than that of the bolt head. Preferably, the recognition protrusion is formed to protrude from a circumferential surface of the O-ring in the radial direction of the bolt head.

Preferably, the first housing comprises a bolt hole pierced such that the screw portion is inserted therein, and the O-ring is interposed between the first housing and the bolt head to seal the bolt hole.

Preferably, the first housing comprises an O-ring groove formed to be recessed such that the O-ring is inserted therein.

Preferably, the O-ring groove has a recognition portion formed to extend in the radial direction of the bolt head such that the recognition protrusion is inserted therein.

In another aspect of the present disclosure, there is also provided a battery module comprising: a housing comprising a accommodation space and a bolt hole; a plurality of secondary batteries accommodated in the accommodation space; a bolt comprising a screw portion and a bolt head arranged at an end of the screw portion, the bolt being mounted such that the screw portion is inserted into the bolt hole, and that the bolt head is caught by the housing; and an O-ring mounted to be interposed between the housing and the bolt head, wherein the O-ring comprises: a hollow pierced such that the screw portion is inserted therein; and a recognition protrusion formed to protrude in a radial direction of the bolt head as compared with the bolt head.

Preferably, the O-ring has a diameter that is equal to or less than that of the bolt head.

In yet another aspect of the present disclosure, there is also provided a battery pack comprising the battery module according to the one aspect of the present disclosure as set forth above and the battery module according to the other aspect of the present disclosure as set forth above.

In yet another aspect of the present disclosure, there is also provided a vehicle comprising the battery pack according to yet the other aspect of the present disclosure as set forth above.

Advantageous Effects

According to the battery module and the battery pack including the battery module according to the present disclosure, when the O-ring is interposed between the bolt head of the bolt and the housing to seal the bolt hole of the housing, into which the screw portion of the bolt is inserted, the recognition protrusion, which protrudes in the radial direction of the bolt head as compared with the bolt head, is provided to the O-ring, whereby whether the O-ring is mounted and whether the O-ring is twisted may be checked by the recognition protrusion even without separating the bolt from the bolt hole.

BEST MODE

Figure 1:
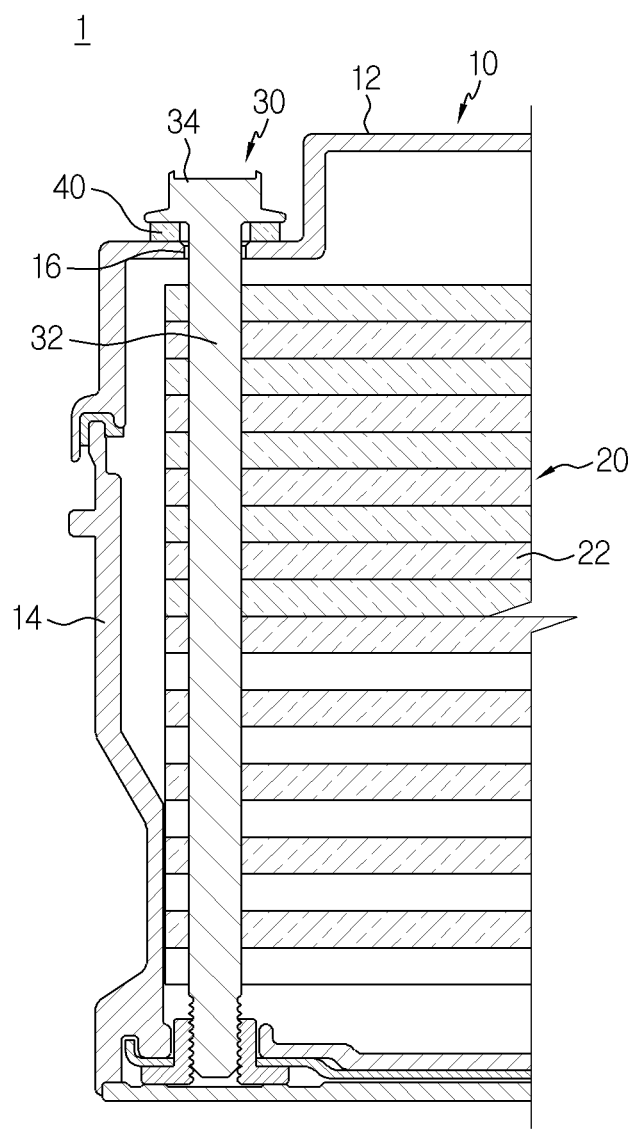
FIG. 1 is a schematic diagram illustrating a battery module according to the related art.

It should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, since embodiments described herein and configurations shown in the drawings are merely preferable examples and do not represent all technical aspects of the present disclosure, it should be understood that various equivalents and modified examples could be made without departing from the scope of the disclosure.

In the drawings, the size of each component or the size of a specific portion constituting each component may be exaggerated, omitted, or schematically illustrated for convenience and clarity. Therefore, the size of each component does not completely reflect the actual size thereof. When it is determined that descriptions of relevant functions or configurations known in the art may unnecessarily obscure the gist of the present disclosure, such descriptions will be omitted.

Figure 2:
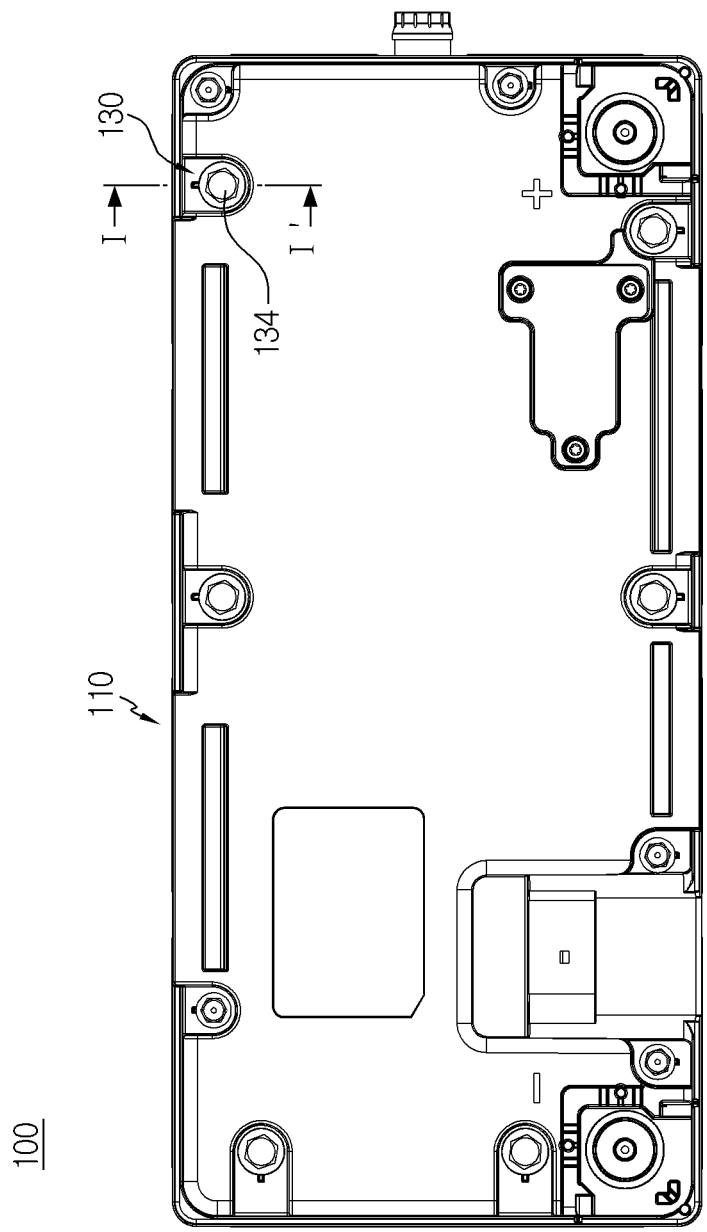
FIG. 2 is a plan view illustrating a battery module according to a preferred embodiment of the present disclosure.
Figure 3:
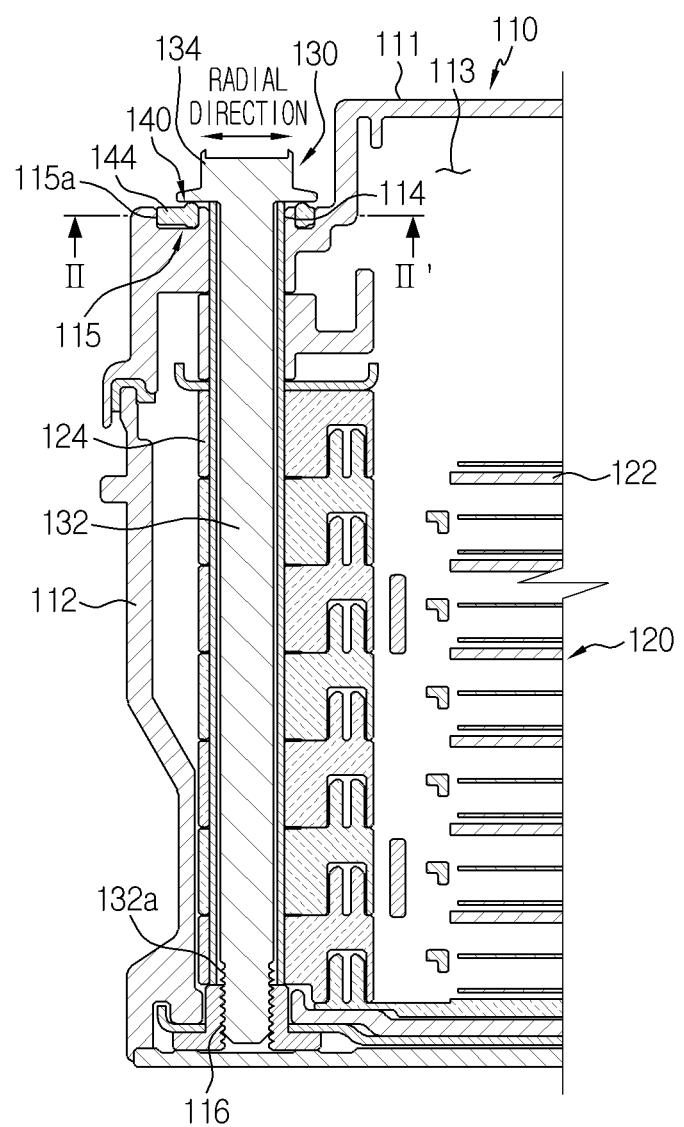
FIG. 3 is a partial cross-sectional view of the battery module of FIG. 2, taken along a line I-I'.
Figure 4:
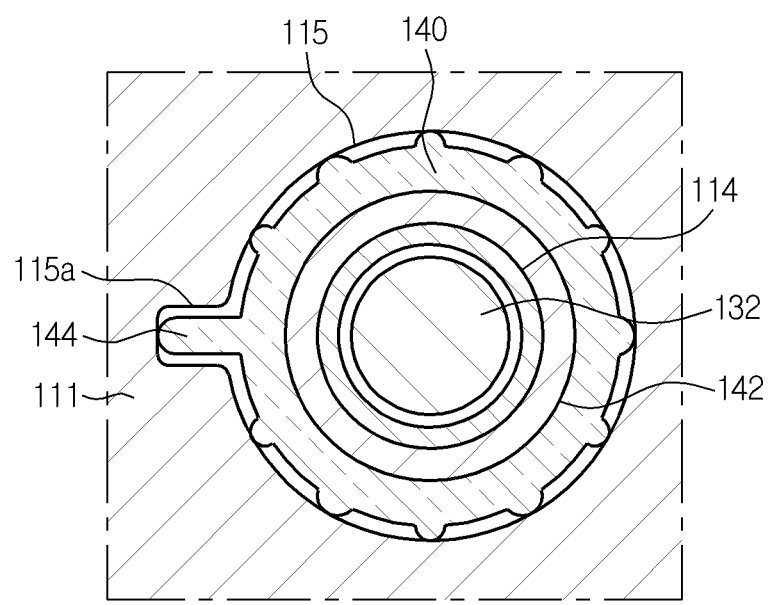
FIG. 4 is a partial cross-sectional view of the battery module of FIG. 3, taken along a line II-II'.

FIG. 2 is a plan view illustrating a battery module according to a preferred embodiment of the present disclosure, FIG. 3 is a partial cross-sectional view of the battery module of FIG. 2, taken along a line I-I', and FIG. 4 is a partial cross-sectional view of the battery module of FIG. 3, taken along a line II-II'.

Referring to FIGS. 2 and 3, a battery module 100 according to a preferred embodiment of the present disclosure includes: a housing 110 including a first housing 111 and a second housing 112, which are coupled to each other to form a accommodation space 113; a secondary battery stacked body 120, which is obtained by stacking a plurality of secondary batteries 122 in multiple layers and is accommodated in the accommodation space 113 of the housing 110; a bolt 130 including a screw portion 132, which penetrates the first housing 111 to be screw-coupled to the second housing 112, and a bolt head 134 caught by the first housing 111, the bolt 130 being configured to fasten the first housing 111 and the second housing 112 to each other; and an O-ring 140 interposed between the bolt head 134 and the first housing 111 to prevent internal gas generated from the secondary batteries 122 from being leaked from the accommodation space of the housing 110.

A plurality of battery modules 100 may be connected in a predetermined electrical connection method and constitute a battery pack. In addition, the battery pack may be mounted and used in vehicles.

First, the housing 110 is a member for protecting the secondary batteries 122 from an outside thereof.

As shown in FIG. 2, the housing 110 is arranged to surround the secondary battery stacked body 120, and a battery management system (BMS) and other various members may be mounted on an outer surface of the housing 110. As shown in FIG. 3, the housing 110 includes the first housing 111 and the second housing 112, which are provided in the manner of being decouplable from and couplable to each other and form the accommodation space 113 for accommodating the secondary battery stacked body 120.

As shown in FIG. 3, the first housing 111 is arranged to surround an upper portion of the secondary battery stacked body 120. As shown in FIG. 3, the first housing 111 includes a first bolt hole 114 pierced such that the screw portion 132 of the bolt 130 is inserted therein, and an O-ring groove 115 formed to be recessed such that the O-ring 140 is at least partially inserted therein.

As shown in FIG. 3, the first bolt hole 114 is formed by perforating the first housing 111 in an up-down direction such that the screw portion 132 of the bolt 130 is inserted into the first bolt hole 114. The first bolt hole 114 provides a path for the screw portion 132 of the bolt 130 to penetrate the accommodation space 113 and extend to the second housing 112.

As shown in FIG. 4, the O-ring groove 115 has a shape corresponding to the O-ring 140 for the O-ring 140 to be at least partially inserted into the O-ring groove 115, and is formed to be recessed on an upper surface of the first housing 111 to surround the first bolt hole 114. The O-ring groove 115 supports the O-ring 140 such that the O-ring 140 interposed between the bolt head 134 of the bolt 130 and the upper surface of the first housing 111 is not moved.

In addition, as shown in FIG. 4, the O-ring groove 115 includes a recognition portion 115a formed to extend such that a recognition protrusion 144 of the O-ring 140 described below is inserted into the recognition portion 115a. The recognition portion 115a is formed to extend from one side of the O-ring groove 115 in a radial direction of the bolt head 134, that is, in a radial direction of the O-ring 140.

As shown in FIG. 3, the second housing 112 is arranged to surround a lower portion of the secondary battery stacked body 120. As shown in FIG. 3, the second housing 112 includes a second bolt hole 116 pierced such that a lower end of the screw portion 132 extending to the second housing 112 is screw-coupled thereto.

As shown in FIG. 3, the second bolt hole 116 is preferably formed on an upper surface of the second housing 112 such that only an upper portion of the second bolt hole 116 is opened and a lower portion thereof is closed, without being limited thereto.

Next, the secondary battery stacked body 120 is a member for providing electric power.

As shown in FIG. 3, the secondary battery stacked body 120 includes the plurality of secondary batteries 122 and a plurality of cartridges 124, each of the plurality of cartridges 124 accommodating at least one of the secondary batteries 122.

Each of the secondary batteries 122 preferably includes a lithium polymer battery. However, the present disclosure is not limited thereto, and each of the secondary batteries 122 may include a lithium ion battery, a nickel cadmium battery, a nickel metal hydride battery, a nickel zinc battery, or the like.

Each of the secondary batteries 122 is preferably configured in a pouch type. However, the present disclosure is not limited thereto, and each of the secondary batteries 122 may be configured in a cylindrical type, an rectangular type, or the like.

Each of the cartridges 124 accommodates and holds at least one of the secondary batteries 122, and thus prevents movements of the secondary batteries 122. In addition, as shown in FIG. 3, the cartridges 124 may be mounted to be penetrated by the screw portion 132 of the bolt 130, and thus secured by the screw portion 132 of the bolt 130. The cartridges 124 are configured to be stackable on each other such that the secondary batteries 122 may be easily stacked and assembled. Thus, the cartridges 124 are stacked in multiple layers and thus form the secondary battery stacked body 120.

FIG. 4 is a partial cross-sectional view of the battery module of FIG. 3, taken along a line II-II'.

Next, the bolt 130 is a member for fastening the first housing 111 and the second housing 112 to each other.

As shown in FIG. 3, the bolt 130 includes the screw portion 132, which has screw threads formed on at least a portion of an outer circumferential surface thereof, and the bolt head 134 arranged at an end of the screw portion 132.

The screw portion 132 has a predetermined length such that the lower end of the screw portion 132 sequentially passes through the first bolt hole 114 and the accommodation space 113 in this stated order and is screw-coupled to the second bolt hole 116. Although screw threads 132a of the screw portion 132 are preferably formed only on an outer circumferential surface of the lower end of the screw portion 132, which is screw-coupled to the second bolt hole 116, the present disclosure is not limited thereto.

The bolt head 134 is arranged at an upper end of the screw portion 132, and has a larger diameter than the first bolt hole 114 not to be inserted into the first bolt hole 114.

As shown in FIG. 3, the bolt 130 may be mounted such that the screw portion 132 is screw-coupled to the second bolt hole 116, and that the bolt head 134 is caught by the upper surface of the first housing 111, thereby fastening the first housing 111 and the second housing 112 to each other.

Next, the O-ring 140 is a member for preventing the internal gas of the secondary batteries 122 from being leaked out of the housing 110.

The O-ring 140 is preferably formed of a synthetic resin material having elasticity, without being limited thereto. As shown in FIG. 4, the O-ring 140 includes a hollow 142 pierced such that the screw portion 132 is inserted therein, and the recognition protrusion 144 formed to protrude in the radial direction of the bolt head 134 as compared with the bolt head 134. In addition, as shown in FIG. 4, the recognition protrusion 144 is preferably formed to protrude from a circumferential surface of the O-ring 140, without being limited thereto.

The O-ring 140 is mounted in the O-ring groove 115 to be interposed between a bottom surface of the bolt head 134 and the upper surface of the first housing 111, and the recognition protrusion 144 is mounted to be inserted into the recognition portion 115a of the O-ring groove 115. Then, the O-ring 140 may seal the first bolt hole 114 and thus prevent the internal gas generated from the secondary batteries 122 from being leaked out of the housing 110 through the first bolt hole 114.

In the case that the O-ring 140 is normally mounted, when the upper surface of the first housing 111 is viewed from an outside of the battery module 100, the recognition protrusion 144 is accommodated in the recognition portion 115a to protrude in the radial direction of the bolt head 134 as compared with the bolt head 134. On the other hand, in the case that the O-ring 140 is not mounted due to process errors or other causes or is twisted due to a shear force applied upon mounting the bolt 130, when the upper surface of the first housing 111 is viewed from the outside of the battery module 100, the recognition protrusion 144 is not accommodated in the recognition portion 115a or is only partially accommodated in the recognition portion 115a. Therefore, in the battery module 100, since whether the O-ring 140 is mounted and whether the O-ring 140 is twisted may be simultaneously checked by the recognition protrusion 144 even without separating the bolt 130 from the first bolt hole 114, productivity may be improved.

Although, when the bolt 130 is mounted for fastening the first housing 111 and the second housing 112 to each other, the O-ring 140 has been described as being interposed between the first housing 11 and the bolt head 134 of the bolt 130 and being used to seal the first bolt hole 114 of the first housing 111, into which the screw portion 132 of the bolt 130 is inserted, the present disclosure is not limited thereto. That is, when a bolt (not shown) different from the bolt 130 set forth above is mounted in the housing 110 for purposes other than the purpose of fastening the first housing 111 and the second housing 112 to each other, the O-ring 140 may be interposed between the housing 110 and a bolt head (not shown) of the bolt and be used to seal a bolt hole (not shown) of the housing 110, into which a screw portion (not shown) of the bolt is inserted. Therefore, even in this case, like in the case of the bolt 130 set forth above, whether the O-ring 140 is mounted and whether the O-ring 140 is twisted may be simultaneously checked by the recognition protrusion 144 even without separating the bolt from the bolt hole.

Heretofore, although the present disclosure has been described with reference to specific embodiments in conjunction with the accompanying drawings, it should be understood that the present disclosure is not limited by these embodiments, and that various modifications, changes, and equivalent embodiments can be made by those skilled in the art without departing from the scope of the present disclosure.

INDUSTRIAL APPLICABILITY

The present disclosure relates to a battery module and a battery pack including the battery module, and the battery module and the battery pack as set forth above may be particularly applied to industries related to secondary batteries.

What is claimed is:

1. A battery module comprising:
a housing comprising a first housing and a second housing, which are coupled to each other to form a accommodation space;
a plurality of secondary batteries accommodated in the accommodation space;
a bolt comprising a screw portion and a bolt head arranged at an end of the screw portion, the bolt being configured to fasten the first housing and the second housing to each other by being mounted such that the screw portion penetrates the first housing to be screw-coupled to the second housing, and that the bolt head is caught by the first housing; and
an O-ring mounted to be interposed between the first housing and the bolt head,
wherein the O-ring comprises:
a hollow pierced such that the screw portion is inserted therein; and
a recognition protrusion formed to protrude in a radial direction of the bolt head as compared with the bolt head.

2. The battery module according to claim 1, wherein the O-ring has a diameter that is equal to or less than that of the bolt head.

3. The battery module according to claim 1, wherein the recognition protrusion is formed to protrude from a circumferential surface of the O-ring in the radial direction of the bolt head.

4. The battery module according to claim 1, wherein the first housing comprises a bolt hole pierced such that the screw portion is inserted therein, and
the O-ring is interposed between the first housing and the bolt head to seal the bolt hole.

5. The battery module according to claim 1, wherein the first housing comprises an O-ring groove formed to be recessed such that the O-ring is inserted therein.

6. The battery module according to claim 5, wherein the O-ring groove has a recognition portion formed to extend in the radial direction of the bolt head such that the recognition protrusion is inserted therein.

7. A battery module comprising:
a housing comprising a accommodation space and a bolt hole;
a plurality of secondary batteries accommodated in the accommodation space;
a bolt comprising a screw portion and a bolt head arranged at an end of the screw portion, the bolt being mounted such that the screw portion is inserted into the bolt hole and the bolt head is caught by the housing; and
an O-ring mounted to be interposed between the housing and the bolt head,
wherein the O-ring comprises:
a hollow pierced such that the screw portion is inserted therein; and
a recognition protrusion formed to protrude in a radial direction of the bolt head as compared with the bolt head.

8. The battery module according to claim 7, wherein the O-ring has a diameter that is equal to or less than that of the bolt head.

9. A battery pack comprising the battery module according to claim 1.

10. A battery pack comprising the battery module according to claim 7.

11. A vehicle comprising the battery pack according to claim 9.

12. A vehicle comprising the battery pack according to claim 10.

* * * * *